L. A. WOLTERS.
OPERATING MECHANISM FOR DISPENSING DEVICES.
APPLICATION FILED MAY 24, 1919.

1,334,728.

Patented Mar. 23, 1920.

Witness:
Harry S. Gaither

Inventor
Leon A. Wolters
By Chamberlin Freudenreich
Attys

UNITED STATES PATENT OFFICE.

LEON A. WOLTERS, OF CHICAGO, ILLINOIS, ASSIGNOR TO THE THORO CORPORATION, OF CHICAGO, ILLINOIS, A CORPORATION OF DELAWARE.

OPERATING MECHANISM FOR DISPENSING DEVICES.

1,334,728.  Specification of Letters Patent.  Patented Mar. 23, 1920.

Application filed May 24, 1919. Serial No. 299,526.

*To all whom it may concern:*

Be it known that I, LEON A. WOLTERS, a citizen of the United States, residing at Chicago, county of Cook, State of Illinois, have invented a certain new and useful Improvement in Operating Mechanism for Dispensing Devices, and declare the following to be a full, clear, and exact description of the same, such as will enable others skilled in the art to which it pertains to make and use the same, reference being had to the accompanying drawings, which form a part of this specification.

My invention relates to devices adapted to hold and deliver powdered or granular material in measured quantities and has for its object to produce a device of this kind which shall be of simple rugged construction so that it will not easily get out of order.

Specifically considered, the present device is an improvement on that shown in the Johnson Patent 1,172,603, dated February 22, 1916, and therefore, viewed in one of its aspects, the present invention may be said to have for its object to simplify the construction disclosed in said patent and make it stronger and more positive in operation.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1:
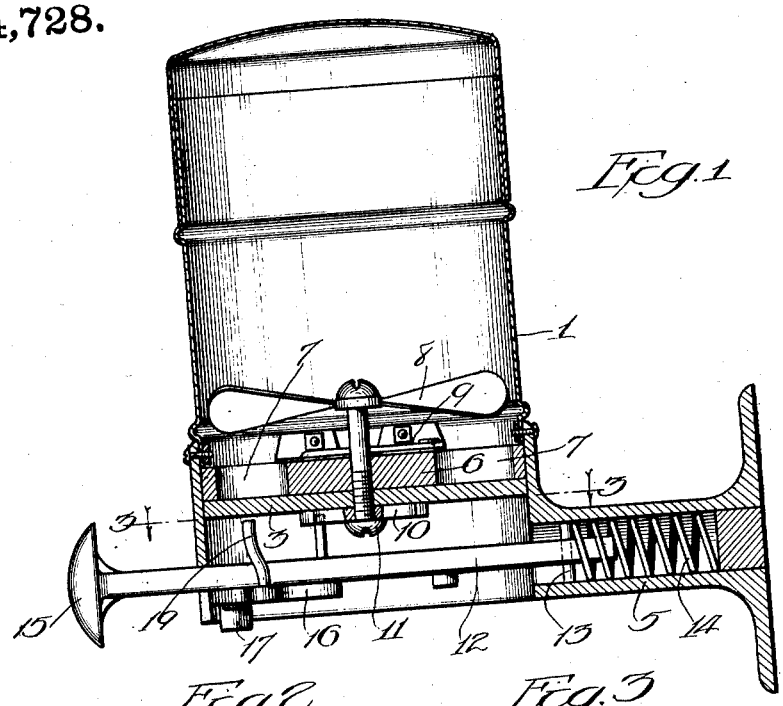
Figure 1 is a central vertical section through a device arranged in accordance with the preferred form of my invention.

Referring to the drawing, 1 represents a suitable receptacle having a skirt or flange, 2, depending below the bottom wall, 3. The wall, 3, is provided, near the edge, with an opening, 4, through which the contents of the receptacle are adapted to be delivered. The flange or skirt, 2, has a tubular bracket or stem, 5, projecting laterally therefrom in the radial direction; the bracket or stem being adapted to be secured to a support to hold the device stationary in any desired location. Overlying the bottom wall of the receptacle is a thick disk, 6, having therein a plurality of distributed openings, 7, which are adapted to register, one after the other, with the opening 4 in the bottom wall of the receptacle, when the disk is rotated. A suitable stirring device, 8, lying above the disk and carried thereby so as to turn therewith, serves to agitate the contents of the receptacle so as to loosen the same in the vicinity of the holes or pockets in the disk. There is a cover plate, 9, overlying the disk just above the hole 4 in the bottom of the receptacle, for the purpose of preventing material from flowing directly from the receptacle out of the said hole and limiting the discharge of material to such quantities as are brought into registration with the discharge hole in the pockets in the disk.

All of the parts heretofore described may be of any usual or suitable construction such, for example, as illustrated in the aforesaid Johnson patent.

On the under side of the bottom wall of the receptacle is a ratchet wheel, 10, having the form of an escapement wheel and fastened to the disk so as to be rigid therewith. This may conveniently be accomplished by passing the shank of a screw, 11, upwardly through the wheel, the bottom wall of the receptacle and into the disk; the screw being screw threaded into the ratchet wheel and into the disk but simply turning loosely in the opening in the bottom wall of the receptacle through which it passes.

An actuating bar, 12, extends diametrically across the device below the bottom wall of the receptacle and through the skirt or flange, one end being provided with a shoulder, 13, which engages with the compression spring 14, housed within the stem or bracket 5 and the other end having a push button or head, 15, by means of which the bar may be pushed inwardly against the tension of the spring. The actuating bar carries a part, 16, which combines the functions of a pawl and a pallet adapted to coöperate with the wheel 10. The part 16 comprises an L-shaped member pivotally supported at the junction of the two arms, as indicated at 17, on the actuating bar so as to be free to oscillate in a plane at right angles to the axis of rotation of the wheel 10 and disk 6. On the free end of each of the two arms of the member 16 is a pin or finger projecting upwardly into the plane of the wheel 10; these fingers being indicated at 18 and 19. The member 16 preferably underlies the actuating bar so that the pins or fingers project upwardly past the same, the bar serving as a limiting stop to limit the swinging movement of the member 16 in either direction. There is a curved heel, 20, projecting laterally from the member 16 at the inner end of the arm carrying the pin 18 and on the opposite side of the pivotal connection, 17, from that on which the pin or finger 19 lies. The parts are so proportioned that normally the spring holds the actuating bar in the position indicated in Figs. 1, 2 and 3, namely in a position in which the heel 20 presses against the skirt or flange 2, causing the member 16 to be swung around until the pin 18 strikes one side of the actuating bar; the parts being now in such positions that one of the pockets in the disk registers with the discharge opening in the bottom wall of the receptacle, and one of the teeth, 21, of the wheel 10 lies directly in the path of movement of the pin 18. As a result of this construction, when the actuating bar is pushed inwardly, the pin 18 engages with the adjacent tooth on the ratchet wheel and turns the ratchet wheel through a predetermined angle so as to bring a succeeding tooth into the position originally occupied by the one in engagement with the pin 18. There may be as many pockets in the disk as there are teeth in the ratchet wheel, and therefore whenever the actuating bar is pushed inwardly it brings a new filled pocket into registration with the discharge opening. The rotation of the ratchet wheel and disk is positively checked at the proper point through the engagement of the pin 19 with the back side of one of the oncoming teeth in the ratchet wheel, as illustrated in Fig. 4, in much the same way as a pallet checks the rotation of an escapement wheel. It will be seen that a very accurate adjustment of the parts may be obtained by simply bending one or both of the pins or fingers until just the desired results are obtained.

Figure 2:
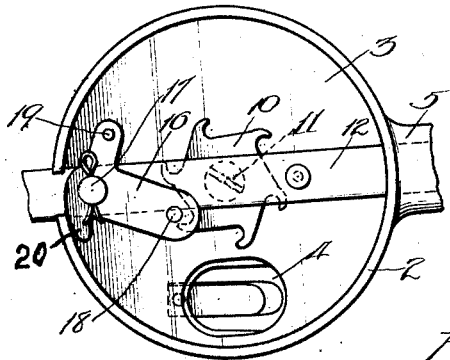
Fig. 2 is a bottom plan view of the device, a part of the supporting stem or bracket being omitted.
Figure 3:
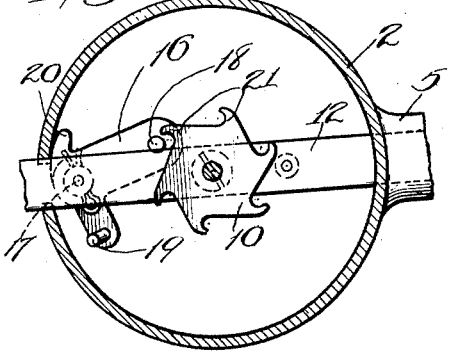
Fig. 3 is a section taken approximately on line 3—3 of Fig. 1.
Figure 4:
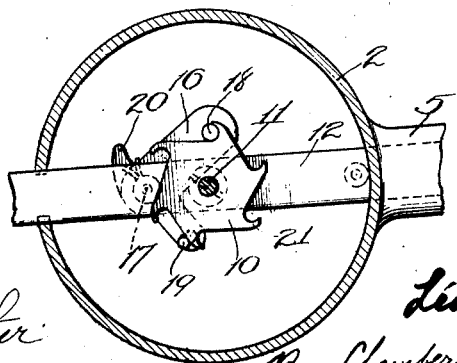
Fig. 4 is a view similar to Fig. 3 showing the parts in a different position.

Upon a removal of the pressure on the actuating rod after it has been pushed in to bring the parts into the positions illustrated in Fig. 4, the spring returns the actuating rod and the member 16 into the positions illustrated in Figs. 1, 2 and 3; there being no tendency to turn the ratchet wheel backward because the pins or fingers simply contact with the same and are not attached thereto in any way.

While I have illustrated and described with particularity only a single preferred form of my invention, I do not desire to be limited to the exact structural details thus illustrated and described; but intend to cover all forms and arrangements which come within the terms employed in the definitions of my invention constituting the appended claims.

I claim:

1. In a device of the character described, a delivery element, a toothed wheel for operating said element a pallet-like part adapted to coöperate with said wheel, an actuating bar supporting said pallet-like part for bodily movements from and toward said wheel, and an abutment for engaging the said pallet-like part for moving it into a predetermined position when retracted.

2. In a device of the character described, a delivery element, a toothed wheel for operating said element, a movable actuating bar, a pallet-like member mounted on said bar and adapted to be moved bodily from and toward said wheel by said bar, said bar and said member having coöperating shoulders to limit the oscillation of said member, and a stationary part adapted to engage with said member to move it into a predetermined angular position when said member is carried by said bar away from said wheel.

3. In a device of the character described, a receptacle having a flange depending below the bottom of the receptacle, a delivery element arranged within the receptacle, a toothed wheel on the under side of the bottom of the receptacle connected to said delivery element, an actuating bar extending through and slidably mounted in said flange, a pallet-like member mounted on said bar and movable bodily thereby from and toward said wheel, a part on said member adapted to engage with said flange to move said member into a predetermined angular position when said bar is moved in the direction to carry said member away from said wheel, and a spring acting on said bar and tending constantly to move it in said direction.

4. In a device of the character described, a receptacle, delivery mechanism including a toothed wheel underlying the bottom of the receptacle, an actuating bar mounted below said wheel, a pallet-like member carried by said bar and lying on the under side thereof, portions of said pallet-like member extending upwardly on opposite sides of the bar into the plane of said toothed wheel, a spring for moving said bar in a direction to carry said member away from said wheel, and a stationary stop adapted to engage with said member and swing it into a predetermined angular position when the bar is moved in the aforesaid direction.

In testimony whereof, I sign this specification.

LEON A. WOLTERS.